March 27, 1956 — E. A. ZDANSKY — 2,739,936
WATER ELECTROLYZER
Filed Feb. 23, 1951
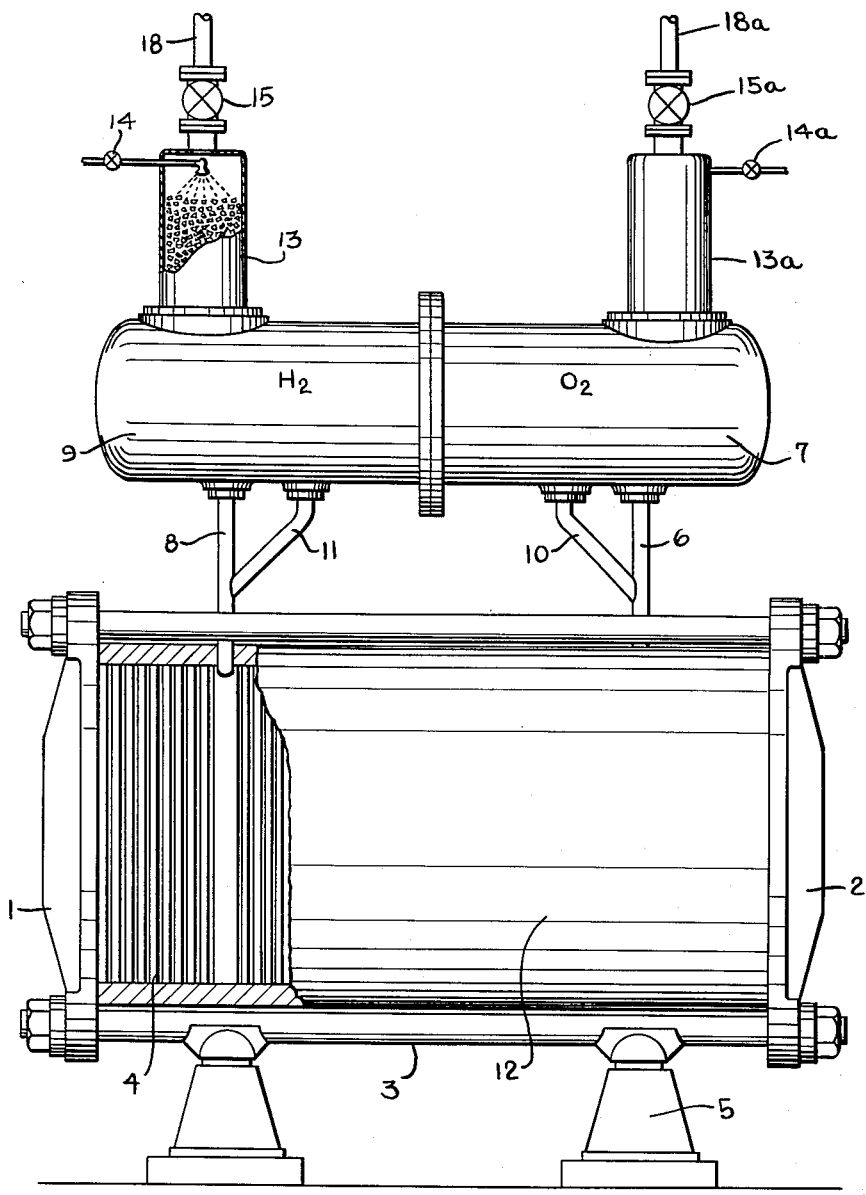
INVENTOR.
EWALD A. ZDANSKY
BY

United States Patent Office 2,739,936
Patented Mar. 27, 1956

2,739,936
WATER ELECTROLYZER

Ewald A. Zdansky, Monthey, Switzerland

Application February 23, 1951, Serial No. 212,310

Claims priority, application Switzerland March 10, 1950

8 Claims. (Cl. 204—256)

My invention relates to pressure-tight water electrolyzers and a manner of operating them.

Especially my invention relates to methods and means for reducing the amount of lost energy in the process of electrolyzing water, by adapting the pressure and temperature to one another within the cells of a multicellular electrolyzer in such a manner, that without any cooling or heating an optimal efficiency is obtained.

From laboratory tests it is already known that in water electrolyzers the cell voltage begins to drop if the working temperature approaches 100° C. But, under technical conditions, nobody, until now has ventured to operate such electrolyzers at temperatures exceeding 85° C. in practice, for anyone skilled in the art in particular has feared a dangerous increase in the corrosive effect of the hot lye, especially on the nickled anode, which with increasing temperature is further intensified by the fact that the evolved gases (hydrogen and oxygen) carry with them increasing quantities of water vapor, thus causing local concentrations in the electrolyte circuit and leading to considerable operational disturbances, particularly to the development of defects in the cell diaphragms.

It has now been found possible, after exhaustive experiments, to control both the increase in the water-vapor content of the flowing gases, and the corrosive effect of the hot lye, even at temperatures up to 120° C., if simultaneously with the working temperature, the working pressure is so increased as to amount to at least three times the value of the saturation pressure of the electrolyte at the particular working temperature. Simultaneously, however, at such high working temperatures the cell voltage decreases so appreciably that with thoroughly sand-blasted electrodes activated in the usual manner, cell voltage values down to less than 1.7 volts can be maintained with current densities up to 10 amps./square decimetre. The maintaining of such exceptionally low voltages in ordinary water electrolyzer cells even under high loading may to a great extent be explained by the complete absence of an excess voltage. This is also confirmed by the circumstance that the above-mentioned voltage value remains constant even after long working periods. This not only enables a considerable and concurrent economy in the current consumption, but furthermore, the power losses are diminished to such an extent that the entire cooling system, hitherto necessary, and which can be very expensive in pressure electrolyzers, is rendered superfluous. Indeed, it becomes advantageous to preheat the feed water slightly, as well as to provide the electrolyzer with a heat-insulating jacket, thus enabling the residual current losses to suffice for maintaining the required high working temperature. The invention thus results in providing a considerably more economical as well as structurally far simpler type of electrolyzer.

A prerequisite for the application of the process according to the present invention is, of course, that the electrolyzer should be capable of supporting the increased working pressure. This may be ensured in known manner by enclosing the entire electrolyzer assembly in a pressure-tight casing or tank, or preferably, by the likewise known construction of pressure-tight individual cells. A further essential condition has been found to be that the usual asbestos diaphragm separating the anode space from the cathode space should be carefully supported on either side, since the asbestos is to some degree weakened in its mechanical properties by immersion in the hot lye, and an unsupported diaphragm would speedily develop cracks and fracture locally. It has been found particularly suitable to enclose the asbestos diaphragm between two narrow-mesh wire gauze sheets in close contact over the whole surface.

The vapor pressure of the potash lye commonly used as the electrolyte in water electrolyzers is considerably lower than the vapor pressure of pure water and depends, furthermore, on the concentration of the lye. This is expressed in the following table:

| Temperature, ° C | 80 | 90 | 100 | 110 | 120 |
|---|---|---|---|---|---|
| Lye, 21.7%: | | | | | |
| Vapor Pressure of Lye atm. absolute | 0.37 | 0.55 | 0.80 | 1.14 | 1.55 |
| Working Pressure not less than atm. gauge | 0.11 | 0.65 | 1.40 | 2.42 | 3.65 |
| Lye, 31.4%: | | | | | |
| Vapor Pressure of Lye atm. absolute | 0.29 | 0.43 | 0.60 | 0.88 | 1.20 |
| Working Pressure not less than atm. gauge | | 0.30 | 0.80 | 1.64 | 2.60 |

The use of high-pressure operation obviously enables the lye concentration to be reduced without accompanying undesirable increase of the volume of water vapor carried away with the escaping gases. This, of course, considerably reduces the corrosive effect of the lye, while the inconsiderable increase in the electrolytic resistance by reduction or disappearance of the excess voltage on the electrodes is more than compensated. For continuous operation it has been found particularly advantageous to work at a temperature of about 110° C. with a lye concentration of about 26% and a working pressure exceeding 5 atmospheres gauge, e. g. between 20 and 50 atmospheres gauge.

In technical practice, it may be recommended to use even considerably higher working pressures: this is in particular beneficial to the diaphragm which is otherwise exposed to considerable mechanical friction by the action of the rising gas bubbles. With increasing working pressure, on the other hand, both gas volume and correspondingly the gas velocity become increasingly smaller, in such manner that at pressures exceeding 20 atmospheres gauge, there is practically no mechanical destruction of a suitably supported diaphragm.

Heating of the feed water is most suitably effected by the liberated gases, more particularly the hydrogen which, on account of its high specific heat and greater volume, is the carrier of the greater part of the heat energy accumulated in the reaction gases. This heat is transmitted most suitably in the manner that feed water and hydrogen are placed in contact in a sprinkler or packed scrubber tower in counterflow the packing constituting obstacle means which guarantee that the gas rising from the top of the scrubber is cooled to substantially the same temperature as the initial temperature of the feed water and that the feed water after reaching the bottom of the scrubber is heated to substantially the same temperature as the initial temperature of the gas entering the bottom of the scrubber. The feed water is then heated from about 20° C. to about 90–100° C., while the hydrogen is cooled down from about 110° C. to about 20° C. The hydrogen is then expanded, e. g., from 30 atm. gauge to a circuit pressure of about 2 atm. gauge, in such manner that the water vapor carried over is practically all precipitated by freezing and only dry gas remains in the circuit, the temperature falling from about 30° C. to about 0° C. In the same manner, a part of the feed water can be used to cool the generated oxygen which is then obtained after decompression, also practically in the dry state. It has been found that the necessary quantity of feed water just suffices at about 25 atm. gauge working pressure to conduct the cooling of the gases in the manner just described.

The drawing shows diagrammatically the arrangement of an electrolyzer suitably constructed for operating the process according to the present invention.

In the usual manner, end plates 1 and 2 hold between them, by means of stay bolts 3, the cell assembly 4 resting on insulators 5 and consisting of flat, circular cells 4 of about 1.5 meters diameter and 20 millimetres thickness each. Each cell contains between its bipolar electrodes a diaphragm dividing the cell space into anode and cathode spaces respectively. The anode spaces are connected by a system of ducts with the oxygen delivery pipe 6 ending in the gas separator 7. The cathode spaces are correspondingly connected by ducts with the hydrogen delivery pipe 8 ending in the gas separator 9. The electrolyte carried over with the gases flows from the gas separator 7 through the anolyte return pipe 10, and from the gas separator 9 through the catholyte return pipe 11, to the cells.

In order to reduce the heat losses, the cell assembly 4 is equipped with a heat-insulating jacket 12. The gas separators 7, 9 as well as the pipe-lines 6, 8, 10, 11 are suitably heat-insulated in the same manner.

If the working temperature is increased, e. g., to 110° C., the hydrogen reaches the gas separator 7 at the same temperature. It is then led over the sprinkler or packed scrubber 13, into which the valve 14 admits the feed water in counterflow to the gas. By this means the temperature of the feed water is raised, and the hydrogen simultaneously cooled, thus leaving the scrubber through the valve 15 at a temperature of about 30° C. The gas then cools by decompression behind the valve 15 to about 4–5° C., when its residual water content is frozen out. The outpipe pipe consequently receives completely dry hydrogen.

While hitherto relatively complicated arrangements have been necessary for cooling and drying the gases supplied by water electrolyzers, the process according to the present invention working at high temperature and correspondingly increased pressure enables considerably simpler operation and construction of the required equipment. All these advantages accompanying the reduction in the cell voltage have hitherto been unknown to the technical expert concerned in coping with the structural difficulties of the cooling arrangements in pressure electrolyzers. In particular, the present pressure electrolyzer allows the attainment of a hitherto unknown degree of operational reliability by this possibility of eliminating the cooling system.

What I claim is:

1. An electrolyzer apparatus comprising, in combination, electrolytic cell means operating under pressure and adapted to generate gas under pressure by electrolyzing a liquid contained therein; gas collecting means connected to said electrolytic cell means for receiving said gas under pressure generated therein and holding said gas under pressure; upwardly extending scrubbing tower means having a top and a bottom and connected at said bottom to and communicating at said bottom with said gas collecting means; outlet means communicating via said scrubbing tower means with said gas collecting means so that said generated gas under pressure is adapted to flow from said gas collecting means through said scrubbing tower means to said outlet means; said outlet means discharging said gas under pressure and thereby decompressing the same; flow-retarding, heat-exchanging obstacle means extending completely across the interior of said scrubbing tower means and distributed along the interior of said scrubbing tower means from the bottom thereof to a level adjacent the top thereof and retarding the free flow of gas upwardly in said scrubbing tower means; and feed means for feeding liquid in at the top of said scrubbing tower means for supplying make-up liquid to said electrolytic cell means via said scrubbing tower means and said gas collecting means so that said liquid passes along said obstacle means in counterflow to the generated gas under pressure, thereby simultaneously washing and cooling the gas while under pressure, said scrubbing tower means together with said obstacle means therein guaranteeing that the gas rising from the top of said scrubbing tower means and before reaching said outlet means is cooled to substantially the same temperature as the initial temperature of the make-up liquid entering the top of said scrubbing tower means, and that the make-up liquid after reaching the gas collecting means is heated to substantially the same temperature as the initial temperature of the gas in said gas collecting means, the thus washed and cooled gas being dried by the following decompression, whereby a cleaned dry gas is obtained.

2. An electrolyzer apparatus comprising, in combination, electrolytic cell means operating under pressure and adapted to generate gas under pressure by electrolyzing a liquid contained therein; gas collecting means connected to said electrolytic cell means for receiving said gas under pressure generated therein and holding said gas under pressure; container means connected to and communicating with said gas collecting means; outlet means communicating via said container means with said gas collecting means so that said generated gas under pressure is adapted to flow from said gas collecting means through said container means to said outlet means, said outlet means discharging said gas under pressure and thereby decompressing the same; obstacle means in the form of a packing in said container means forcing the gas to travel along tortuous paths upwardly along said container means and retarding the free flow of gas upwardly in said container means; and feed means opening into said container means at a top portion thereof for supplying makeup liquid to said electrolytic cell means via said container means and said gas collecting means so that said liquid passes along said obstacle means in counterflow to the flow of the generated gas under pressure, thereby simultaneously washing and cooling the gas while under pressure, said container means together with said obstacle means therein, thus constituting scrubbing means, said obstacle means guaranteeing that the gas rising from the top of said scrubber means and before reaching said outlet means is cooled to substantially the same temperature as the initial temperature of the feed means, and that the makeup liquid after reaching the gas collecting means is heated to substantially the same temperature as the initial temperature of the gas in said gas collecting means, the thus washed and cooled gas being dried by the following decompression, whereby a cleaned dry gas is obtained.

3. An electrolyzer apparatus comprising, in combination, electrolytic cell means including bipolar electrode means and operating under pressure and adapted to generate gas under pressure by electrolyzing a liquid contained therein; gas collecting means connected to said electrolytic cell means for receiving said gas under pressure generated therein and holding said gas under pressure; container means connected to and communicating with said gas collecting means; outlet means communicating via said container means with said gas collecting means so that said generated gas under pressure is adapted to flow from said gas collecting means through said container means to said outlet means, said outlet means discharging said gas under pressure and thereby decompressing the same; obstacle means in the form of a packing in said container means forcing the gas to travel along tortuous paths upwardly along said container means and retarding the free flow of gas upwardly in said container means; and feed means opening into said container means at a top portion thereof for supplying makeup liquid to said electrolytic cell means via said container means and said gas collecting means so that said liquid passes along said obstacle means in counterflow to the flow of the generated gas under pressure, thereby simultaneously washing and cooling the gas while under pressure, said container means together with said obstacle means therein, thus constituting scrubbing means, said obstacle means guaranteeing that the gas rising from the top of said scrubber means and before reaching said outlet means is cooled to substantially the same temperature as the initial temperature of the feed means, and that the make-up liquid after reaching the gas collecting means is heated to substantially the same temperature as the initial temperature of the gas in said gas collecting means, the thus washed and cooled gas being dried by the following decompression, whereby a cleaned dry gas is obtained.

4. An electrolyzer apparatus comprising, in combination, electrolytic cell means including bipolar electrode means and operating under pressure and adapted to generate two gases under pressure by electrolyzing a liquid contained therein; gas collecting means having two separate chambers each connected to said electrolytic cell means for separately receiving said gases under pressure generated therein and holding said gases under pressure; container means connected to and communicating with each chamber of said gas collecting means; outlet means communicating via said container means with each of said gas collecting means so that said generated gases under pressure are adapted to flow from said gas collecting means through said container means to said outlet means, said outlet means discharging said gases under pressure and thereby decompressing the same; obstacle means in the form of a packing in said container means forcing the gases to travel along tortuous paths upwardly along said container means and retarding the free flow of gases upwardly in said container means; and feed means opening into each container means at the top thereof for supplying makeup liquid to said electrolytic cell means via said container means and said gas collecting means so that said liquid passes along said obstacle means in counterflow to the flow of each generated gas under pressure, thereby simultaneously washing and cooling the gases while under pressure, said container means together with said obstacle means therein, thus constituting scrubbing means, said obstacle means guaranteeing that the gases rising from the tops of said scrubber means and before reaching said outlet means are cooled to substantially the same temperature as the initial temperature of the feed means respectively, and the feed means after reaching each chamber of the gas collecting means are heated to substantially the same temperature as the initial temperature of the gases in said gas collecting means respectively, the thus washed and cooled gases being dried by the following decompression, whereby cleaned dry gases are obtained.

5. An electrolyzer apparatus comprising, in combination, electrolytic cell means operating under pressure and adapted to generate two gases under pressure by electrolyzing a liquid contained therein; gas collecting means having two separate chambers each connected to said electrolytic cell means for separately receiving said gases under pressure generated therein and holding said gases under pressure; outlet means connected to each chamber of said gas collecting means for discharging the gas under pressure collected therein and thereby decompressing the same; container means arranged between at least one of said chambers of said gas collecting means and said outlet means through which said generated gas under pressure therein is adapted to flow from said gas collecting means to said outlet means; obstacle means in the form of a packaging in said container means forcing the gas to travel along tortuous paths upwardly along said container means and retarding the free flow of gas upwardly in said container means; and feed means opening through spray means into said container means for supplying makeup liquid to said electrolytic cell means via said scrubber means and said gas collecting means so that said liquid passes in counterflow along said obstacle means to the flow of the generated gas under pressure, thereby simultaneously washing and cooling the gas while under pressure, said container means together with said obstacle means therein, thus constituting scrubbing means, said obstacle means guaranteeing that the gas rising from the top of said scrubber means and before reaching said outlet means is cooled to substantially the same temperature as the initial temperature of the feed means, and that the make-up liquid after reaching the gas collecting means is heated to substantially the same temperature as the initial temperature of the gas in said gas collecting means, the thus washed and cooled gas being dried by the following decompression, whereby a cleaned dry gas is obtained.

6. An electrolyzer apparatus comprising, in combination, electrolytic cell means operating under pressure and adapted to generate gas under pressure by electrolyzing a liquid contained therein; gas collecting means connected to said electrolytic cell means for receiving said gas under pressure generated therein and holding said gas under pressure; container means connected to and communicating with said gas collecting means; outlet means communicating with said container and through said container means with said gas collecting means so that said generated gas under pressure is adapted to flow from said gas collecting means through said container means to said outlet means, said outlet means discharging said gas under pressure and thereby decompressing the same; obstacle means in the form of a packing in said container means forcing the gas to travel along tortuous paths upwardly along said container means and retarding the free flow of gas upwardly in said container means; and feed means opening into said container means for supplying makeup liquid to said electrolytic cell means via said container means and said gas collecting means so that said liquid passes in counterflow along said obstacle means to the flow of the generated gas under pressure, thereby simultaneously washing and cooling the gas while under pressure, said container means together with said obstacle means therein, thus constituting scrubbing means, said container means being pressure resistant and enclosed by heat insulating material, said obstacle means guaranteeing that the gas rising from the top of said scrubber means and before reaching said outlet means is cooled to substantially the same temperature as the initial temperature of the feed means, and that the make-up liquid after reaching the gas collecting means is heated to substantially the same temperature as the initial temperature of the gas in said gas collecting means, the thus washed and cooled gas being dried by the following decompression, whereby a cleaned dry gas is obtained.

7. An electrolyzer apparatus, comprising, in combination electrolytic cell means operating under pressure and adapted to generate gas under pressure by electrolyzing a liquid contained therein; gas collecting means connected to said electrolytic cell means for receiving said gas under pressure generated therein and holding said gas under pressure; container means connected to and communicating with said gas collecting means; outlet means communicating via said container means with said gas collecting means so that said generated gas under pressure is adapted to flow from said gas collecting means through said container means to said outlet means, said outlet means discharging gas under pressure and thereby decompressing the same; obstacle means in the form of a packing in said container means forcing the gas to travel along tortuous paths upwardly along said container means and retarding the free flow of gas upwardly in said container means; and feed means opening into said container means for supplying makeup liquid to said electrolytic cell means via said container means and said gas collecting means so that said liquid passes along said obstacle means in counterflow to the flow of the generated gas under pressure, thereby simultaneously washing and cooling the gas while under pressure, said container means together with said obstacle means therein, thus constituting scrubbing means, said container means and said gas collecting means being pressure resistant and enclosed by heat insulating material, said obstacle means guaranteeing that the gas rising from the top of said scrubber means and before reaching said outlet means is cooled to substantially the same temperature as the initial temperature of the feed means, and that of the make-up liquid after reaching the gas collecting means is heated to substantially the same temperature as the initial temperature of the gas in said gas collecting means, the thus washed and cooled gas being dried by the following decompression, whereby a cleaned dry gas is obtained.

8. An electrolyzer apparatus, comprising, in combination, an assembly of electrolytic cells operating under pressure and adapted to generate hydrogen and oxygen under pressure by electrolyzing water contained therein; gas collecting means arranged above and connected to said assembly of electrolytic cells and having two separate compartments for separately receiving the hydrogen and oxygen under pressure generated therein and holding said gases under pressure; outlet means connected to each chamber of said gas collecting means for discharging the gas under pressure and thereby decompressing the same; a pair of pressure-resistant container means each having a top and a bottom and each arranged between one chamber of said gas collecting means and its respective outlet means, and through which each gas under pressure is adapted to flow from the bottom to the top thereof from the respective chamber of said gas collecting means to said outlet means thereof; obstacle means in the form of a packing in said container means forcing the gas to travel along tortuous paths upwardly along said container means and retarding the free flow of gas upwardly in said container means; and feed means opening into the top of each scrubber means for supplying makeup water through spray means to said assembly of electrolytic cells via said container means and said gas collecting means so that said water passes downwardly along said obstacle means in counterflow to the flow of the hydrogen and oxygen under pressure, thereby simultaneously washing and cooling the gases while under pressure, said container means together with said obstacle means therein, thus constituting scrubbing means, said obstacle means guaranteeing that the gases rising from the tops of said scrubber means and before reaching said outlet means are cooled to substantially the same temperature as the initial temperature of the feed means respectively, and the feed means after reaching each chamber of the gas collecting means are heated to substantially the same temperature as the initial temperature of the gases in said gas collecting means respectively, the thus washed and cooled gases being dried by the following decompression thereof, whereby cleaned dry gases are obtained.

References Cited in the file of this patent

UNITED STATES PATENTS

| | | |
|---|---|---|
| 1,222,809 | Sebille | Apr. 17, 1917 |
| 1,564,406 | Cowles | Dec. 8, 1925 |
| 1,566,543 | Knowles | Dec. 22, 1925 |
| 1,855,732 | Smith | Apr. 26, 1932 |
| 1,963,959 | Enzor | June 26, 1934 |
| 2,070,612 | Niederreither | Feb. 16, 1937 |
| 2,494,264 | Ryman | Jan. 10, 1950 |

OTHER REFERENCES

Noeggerath, "Pressure Electrolysis—Power and Fuel," Proceedings 2d Intl. Conference on Bituminous Coal, November 1928, vol. 2, pp. 400 to 412.